Figure 1:
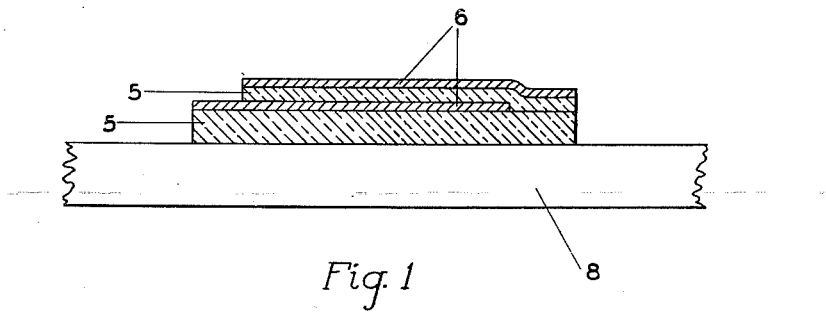

Nov. 27, 1945.  A. J. DEYRUP ET AL  2,390,025

PROCESS FOR THE MANUFACTURE OF ELECTRICAL CAPACITORS

Filed Oct. 4, 1943

INVENTOR.
ALDEN J. DEYRUP
KERMIT H. BALLARD

BY

*E. H. O'Brien*
ATTORNEY

Patented Nov. 27, 1945

2,390,025

UNITED STATES PATENT OFFICE 2,390,025

PROCESS FOR THE MANUFACTURE OF ELECTRICAL CAPACITORS

Alden J. Deyrup, Westfield, and Kermit H. Ballard, Perth Amboy, N. J., assignors to E. I. du Pont de Nemours & Company, Wilmington, Del., a corporation of Delaware Application October 4, 1943, Serial No. 504,883

4 Claims. (Cl. 29—25.42)

This invention relates to certain new and improved methods for manufacturing capacitors or electrical condensers of the type that the employed, for example, in electrical or radio apparatus. More particularly, it relates to a new and improved method for manufacturing the improved monolithic ceramic electrical capacitors disclosed in our copending application, Serial No. 504,882, filed October 4, 1943.

Electrical capacitors comprise, as the essential unit, two or more electrically conductive layers separated by one or more layers of insulating material possessing dielectric properties. Various processes for fabricating electrical capacitors or electrical condensers of the type formed of ceramic materials and utilizing various vitreous enamel compositions as the dielectric are now available, certain satisfactory methods being disclosed, for example, in the copending application of Ballard, Serial No. 494,627, filed July 14, 1943. As disclosed in that application, capacitors of the type indicated are fabricated of ceramic materials and may be prepared by spraying layers of powdered vitreous enamel dielectric and layers of powdered silver on a suitable ceramic base, this base being formed generally of porcelain or steatite. In spraying the layers of powdered enamel and powdered silver, applied alternately to the ceramic base, the enamel and powdered silver are each suspended in a suitable vehicle. The entire unit is then fired to form a monolithic structure, terminals for the electrical connections and protective insulating cases or coatings being then usually provided to form the complete electrical capacitor.

When it is desired to prepare electrical capacitors of high capacity it is usually necessary to provide a plurality of dielectric layers each formed of insulating vitreous enamel, these dielectric layers being alternated with the conductive layers of silver. When an attempt is made to mature as many of these alternating layers as possible in a single firing operation the resulting product is found to be of uncertain and unsatisfactory quality, generally breaking down under impressed voltage when tested in accordance with the standard dielectric break-down test. As a general rule, it has not been found practical to fire in a single firing operation over two layers of dielectric (said layers being separated by the conductive silver layer), without securing a product characterized by excessive losses when tested under impressed electrical voltage in the dielectric break-down test.

It is an object of this invention to render available for use in the manufacture of electrical capacitors a process which permits the maturing of multiple-layer ceramic capacitors provided with vitreous enamel dielectric layers in a single firing operation, thus permitting the securing of monolithic fused capacitor units in a single firing step, regardless of the number of dielectric layers and silver layers to be fired. Another object of this invention is to provide a process by which the improved electrical capacitors described in our copending application, Serial No. 504,882 filed October 4, 1943, may be efficiently and economically fabricated. Still another object of this invention is to provide a procedure by which the highly efficient dielectric compositions described in copending application, Serial No. 504,888 filed October 4, 1943, may be utilized in the production of electrical condensers of high electrical efficiency. These and still other objects of our invention will be apparent from the ensuing description of certain preferred embodiments thereof.

In utilizing our improved process for manufacturing electrical capacitors we find it desirable first to apply a layer of dielectric vitreous enamel composition, which composition may be suspended in a suitable vehicle, to any convenient temporary base. On the resulting layer of powdered dielectric vitreous enamel there is then applied an electrode layer of powdered silver. A second layer of powdered dielectric enamel is positioned on the powdered silver electrode layer, and a second powdered silver electrode layer is then positioned on the second layer of dielectric enamel. In this way any desired number of electrode layers and dielectric enamel layers may be built up, alternating electrode layers of powdered silver and dielectric layers of powdered vitreous composition, these layers being positioned spatially as is usual in electrical capacitors.

When the desired number of layers is built up, the unfired unit is then placed on a temporary base for firing. This temporary base should be of such character that the vitreous material forming the dielectric layer will not adhere thereto during the firing or maturing operation. In this way the uncompleted unit is free to shrink during firing in all three dimensions, thus avoiding any tendency toward warping or cracking which might be induced by the shrinking stresses normally accompanying the maturing of vitreous powdered materials on a rigid supporting base to which they adhere. In this way the incomplete unit is fired to a temperature high enough to fuse the alternating layers to a monolithic structure, free of any appreciable porosity.

The complete unit may now be fabricated into a complete capacitor in any suitable manner such as, for example, by soldering alternating electrodes together, each group of electrodes so soldered together being then connected to wire terminals or lugs. An insulating wax, varnish, or other coating, or a surrounding molded plastic case formed of insulating material, may then be placed around the exterior of the capacitor unit.

Figure 2:
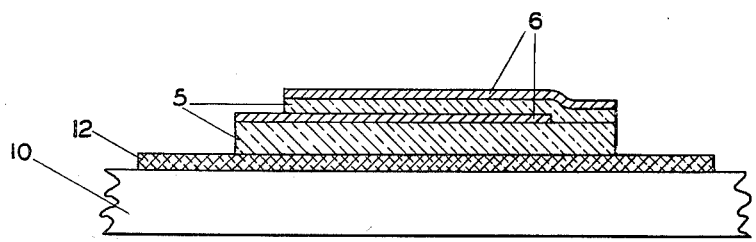
Figure 3:
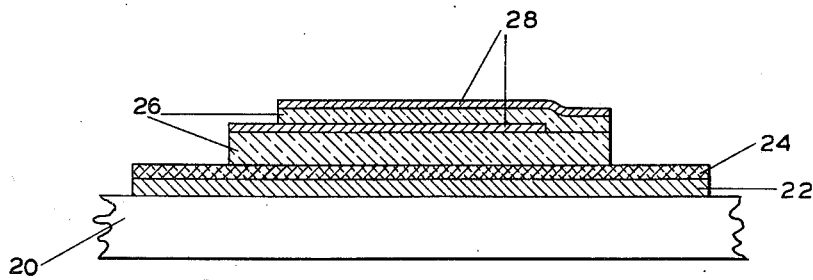

Our improved process for preparing electrical capacitors is illustrated in the accompanying drawing wherein Figure 1 shows the alternate layers of insulating vitreous enamel in powdered form and powdered silver electrode layers, the whole being positioned on a temporary support. Figure 2 shows the raw, incomplete, or unfired unit removed from the temporary base of Figure 1 and placed upon a second temporary base, there being provided between this second temporary base and the lowermost layer of vitreous enamel powder a coating serving to prevent adhesion of the two. Figure 3 illustrates our process wherein alternate layers of dielectric vitreous composition in powdered form and silver paste electrode layers (formed of silver powder suspended in a suitable vehicle) are built up directly on a temporary support provided with a coating to which the vitreous enamel will not adhere during the process of firing, this figure also illustrating that step wherein a separation layer, coat, or member is positioned between the non-adhesion layer or coating on the temporary ceramic base and the lowermost layer of vitreous enamel.

Referring more specifically to Figure 1, the electrical capacitor is built up by positioning alternating layers of vitreous enamel dielectric 5 separated by layers of powdered silver suspended in a suitable medium 6, the whole being positioned on a temporary support 8. The drawing shows only two layers of dielectric enamel and two layers of powdered silver, the latter constituting the electrodes of the capacitor. But, as previously pointed out, any desired number of such layers could be built up on the temporary support 8. As shown, the lowermost layer of vitreous enamel dielectric composition may be made somewhat thicker so that after firing, it may also act as a support for the capacitor.

The temporary base or support 8 may be formed of a number of materials and we have secured very satisfactory results with bases formed of glass, metal plates, or in some instances even paper. The completed unfired electrical capacitor may be readily removed from the temporary base 8, and we have found it very satisfactory to separate the unfired capacitor by means of a knife or other cutting utensil from the temporary base. The element comprising the capacitor, first built up as shown in Figure 1 on the temporary base 8, is then removed to the support shown in Figure 2 comprising the temporary base coated with a non-adhesion layer or coating 12. This figure shows the alternate layers of vitreous enamel composition 5, and the layers of powdered silver suspended in a suitable vehicle to provide a silver paste 6, this silver paste, when fired, providing the electrode layers of the electrical capacitor, all as in Figure 1.

The non-adhesion or separation coating 12 on temporary support or base 10 may comprise a material such as calcined kaolin (kaolin calcined at about 800° C.) calcined alumina or calcined bentonite, the latter material being preferred. We have found that by positioning between the lowermost layer of dielectric enamel 15 and the temporary support 10 this non-adhesion coating layer 12 it is possible to fire the entire unit in a single firing operation, thus maturing it to a unitary monolithic structure without any danger of warpage of the capacitor surfaces during firing.

Referring now more particularly to Figure 3, this drawing illustrates our invention wherein the temporary supporting base 20 is coated with a non-adhesion coating 22 and a separation layer or coating 24, the whole being positioned between the lowermost layer of vitreous dielectric 26 and the temporary support 20. This figure shows alternate layers of vitreous enamel dielectric 26 and alternate layers of powdered silver suspended in a suitable vehicle (silver paste), the latter being designated by the numerals 28. Here again only two layers of dielectric and two layers of silver paste electrodes are shown, although any convenient or desired number, necessary to secure the desired electrical capacity, may be utilized in building up the capacitor.

In Figure 3 the separation layer 24 on the non-adhesion coating 22 is formed of an organic material such as ethyl cellulose, conveniently applied in the form of its solution in methanol. Powdered cane sugar may also be utilized. This layer 24, which we have termed the separation layer or coating, on the non-adhesion coating 22, serves to prevent mingling of dielectric vitreous enamel with the non-adhesion coating.

In utilizing our process the following procedure may be taken as illustrative:

A powdered dielectric vitreous enamel consisting of finely powdered vitreous flux A, as described in our copending application, Serial No. 504,888, filed October 4, 1943, was suspended in a vehicle made up as follows:

| | Per cent |
|---|---|
| Turpentine | 72 |
| Hydrogenated rosin | 12 |
| Methyl abietate | 14 |
| Diethyl oxalate | 2 |

Flux A, as described in the above identified copending application, has the following composition:

| | Per cent |
|---|---|
| PbO | 53.2 |
| $SiO_2$ | 27.1 |
| $K_2O$ | 2.6 |
| $Na_2O$ | 1.6 |
| $LiO_2$ | 0.7 |
| NaF | 4.5 |
| MgO | 3.6 |
| SrO | 6.7 |

In place of flux A, any other of the various compositions as represented by the other seven vitreous materials of Table II of said patent application may be utilized.

This material, suspended in the vehicle having the indicated composition, which mixture will hereinafter be designated as the dielectric slip, was sprayed on a flat glass plate to a thickness of approximately ¼". This coating was then dried and there was applied over it a layer of reduced silver powder, hereinafter designated as silver paste. This silver paste comprised reduced silver powder suspended in a vehicle having the following composition:

| | Per cent |
|---|---|
| Hydrogenated rosin | 14.5 |
| Ethyl cellulose | 1.5 |
| Pine oil | 84.0 |

The electrode layer was applied utilizing the squeegee stencil process.

After drying the silver paste layer, a second thin layer of dielectric slip (approximately 0.003 inch in thickness) was applied by spraying over the electrode layer, one end of the electrode layer being masked to prevent its being coated. The element was again allowed to dry and a second layer of silver paste was applied over the first electrode layer, being so positioned with respect thereto that it was insulated therefrom and separated by the previously applied second dielectric layer. After drying, the unit was cut off the glass plate used as temporary support, trimmed to the desired size, and was then placed on a metal plate which had previously been coated with a layer of non-adhesion coating comprising the following:

| | Per cent |
|---|---|
| Bentonite (pre-calcined at 800° C.) | 10 |
| Dextrine | 4 |
| Water | 86 |

The incomplete capacitor, supported on the metal plate and separated therefrom by the non-adhesion coating, was then placed in a furnace, slowly fired to 720° C., and then slowly annealed. It was then removed from the metal plate. Copper wires were then soldered to the silver electrodes. The vitrified fired unit was rinsed in water, and then coated with ceresine wax, thereby forming the completed capacitor having a power factor of less than 0.025%.

In this way we have fabricated electrical capacitors containing up to 16 layers of vitreous enamel dielectric and 17 layers of silver electrodes. Of a large group of such condensers manufactured, we have found that over half were capable of withstanding dielectric break-down tests when subjected to potentials of over 1,000 volts. The resulting products were free, to an amazing degree, from flaws and pin holes, a condition never previously obtainable in multi-layer firing of ceramic electrical capacitors.

Many embodiments of our process as herein described may be utilized to produce improved electrical capacitors of the type described in our copending application, Serial No. 504,882, filed October 4, 1943. Thus, the raw or unfired capacitor unit may be built up on a wide variety of temporary bases such as those of glass, metal or paper, and may be removed therefrom in a variety of ways to the temporary firing base, such as by cutting off with a knife or any other cutting member. If desired, the capacitor unit can be built up on the non-adhesion coating on the temporary base used for firing. In such case, however, we have found it necessary to pre-coat the non-adhesion coating with a separation coating comprising an organic material such as ethyl cellulose, conveniently applied in a solution of methanol to the non-adhesion layer. In place of ethyl cellulose, powdered cane sugar can also be used. If this is not done warpage of the capacitor unit may occur during firing. The use of such a separation coating is illustrated, for example, in Figure 3.

Any desired dielectric vitreous material may be employed, but we prefer to use the highly efficient compositions disclosed in copending application, Serial No. 504,888 filed October 4, 1943. Homogeneous mixtures of dielectric materials have also been successfully employed. The first layer of dielectric material applied to the temporary support or base may be very thin, or it may be sufficiently thick to constitute a reinforcing base for the completed capacitor unit. It is preferable to maintain a high degree of homogeneity in all vitreous enamels employed in order to prevent warpage of the units during firing.

A variety of vehicles may be employed for both the silver powder used in forming the electrodes and powdered dielectric vitreous compositions. Both spray and squeegee screen stencil methods have been employed with success. We prefer to use the spraying method for the dielectric composition, the suspension of this powdered vitreous material in a vehicle being sprayed by means of a suitable spray apparatus. However, for the application of the silver, we prefer to use the squeegee method employing a suitable stencil. In choosing vehicles, both for the vitreous composition and powdered silver, care should be exercised to select materials which do not char or leave behind undesirable residues. It is preferable to employ temporary bonding agents of a viscous nature in the vehicle, thereby imparting to the unfired cake a degree of plasticity permitting easy cutting to the desired size without danger of cracking and chipping the temporarily bonded unit.

Where a plurality of electrodes of like polarity are utilized they are more conveniently and efficiently connected together by trimming the unfired unit in such a manner as to cut through and expose their ends. These end sections are then painted with silver paste. On firing, the matured silver not only connects these electrodes of like polarity, but also serves as a base to which electrical lead wire or terminals may be soldered. Connection of the various electrodes of like polarity may also be carried out by painting the exposed ends of the electrodes with silver after firing, and then subjecting the assembly to a re-firing operation to fuse and mature the painted silver.

In preparing non-adhesion coatings for temporary bases such as layers 12 and 22 of Figures 2 and 3, we prefer to use calcined bentonite, applied as a suspension in water, although a number of materials including kaolin calcined to 800° C. have also been found satisfactory.

In the firing operation we prefer to raise the temperature slowly to drive out the temporary bonding agents without charring or entrapment of carbon particles. It is indeed surprising that extremely thick multi-layer capacitors may be thus fabricated without the interior portions thereof being damaged by the formation of carbonaceous residues. In practice we prefer to anneal the condenser units, as we find that the power factor is decreased by about 30% to 40% as a result of this treatment.

A very satisfactory method of positioning the electrodes of electrical capacitors in layers, adaptable for utilization in a continuous process of manufacture, is disclosed in copending application, Serial No. 504,885 filed October 4, 1943. This procedure involves cutting across the unfired, built-up unit to expose the end surfaces of the alternate silver layers comprising the electrodes, and painting a conductive silver paste (silver suspended in a suitable vehicle) across the cut portions whereby the exposed silver layers are electrically connected, and will be electrically connected by metallic silver after the unit is fired.

In practice we have found it possible to build up a plurality of condenser units simultaneously on one temporary base. This permits increased efficiency by reducing the amount of handling required for individual capacitor units. These advantages are in addition to the reduction in the cost secured by the reduction in the number of distinct firing cycles required.

Various changes may be made in our process as herein described without departing from the scope of our invention. Accordingly, it is our intention that such changes shall be included within its scope, to the extent that they are within the purview of the appended claims.

We claim:

1. The process of manufacturing an electrical capacitor of the type comprising a plurality of vitreous enamel dielectric layers separating fired silver electrode layers which comprises, building up on a temporary supporting base a plurality of layers of powdered dielectric vitreous enamel suspended in a suitable vehicle, and a plurality of layers of silver paste, said enamel and said silver paste layers alternating in position, removing the resulting incomplete capacitor structure from said temporary base and transferring it to a second temporary base, the lowermost layer of vitreous enamel dielectric being separated from said second temporary base by means of a non-adhesion layer, and firing the resulting structure to provide a unitary monolithic electrical capacitor of the type described.

2. The process of manufacturing an electrical capacitor of the type comprising a plurality of vitreous enamel dielectric layers separating fired silver electrode layers which comprises, building up on a temporary supporting base a plurality of layers of powdered dielectric vitreous enamel, and a plurality of layers of silver powder, said layers alternating, and there being provided between the lowermost vitreous enamel layer and the temporary support a non-adhesion layer, and then firing the resulting structure to provide a unitary monolithic electrical capacitor of the type described.

3. The process of manufacturing an electrical capacitor of the type comprising a plurality of vitreous enamel dielectric layers separating fired silver electrode layers which comprises, preparing a temporary supporting base by applying thereto a non-adhesion coating and positioning on top of said non-adhesion coating a second coating consisting of a separation layer, building up on said separation layer a plurality of layers of powdered vitreous enamel suspended in a suitable vehicle and a plurality of layers of silver paste, said vitreous enamel layers and said silver paste layers alternating, and then firing the resulting structure on said temporary base to provide a unitary monolithic electrical capacitor of the type described.

4. The process of manufacturing an electrical capacitor of the type comprising a plurality of vitreous enamel dielectric layers separating fired silver electrode layers which comprises, building up on a temporary supporting base a plurality of layers of powdered vitreous enamel suspended in a suitable vehicle and a plurality of layers of silver powder suspended in a suitable vehicle, said vitreous enamel layers and said silver layers alternating, cutting through said unit whereby the end surfaces of said silver layers are exposed, painting conductive silver paste across the cut portions whereby said exposed silver layers are electrically connected, transferring the resulting structure to a second temporary supporting base, which supporting base is provided with a non-adhesion layer, said non-adhesion layer being interposed between said base and the lowermost layer of vitreous enamel dielectric, and firing the resulting structure to provide a unitary monolithic electrical capacitor of the type described.

ALDEN J. DEYRUP.
KERMIT H. BALLARD.